US006941518B2

(12) United States Patent
French et al.

(10) Patent No.: US 6,941,518 B2
(45) Date of Patent: Sep. 6, 2005

(54) METHOD AND SYSTEM FOR BOOTING OF A TARGET DEVICE IN A NETWORK ENVIRONMENT BASED ON A PROVIDED ADMINISTRATOR TOPOLOGY GUI

(75) Inventors: Steven M. French, Austin, TX (US); Lorin E. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 09/895,973

(22) Filed: Jun. 29, 2001

(65) Prior Publication Data

US 2003/0014621 A1 Jan. 16, 2003

(51) Int. Cl.[7] .............................. G06F 3/00; G06F 9/00; G06F 17/00

(52) U.S. Cl. ........................ 715/736; 715/171; 715/734; 715/853; 715/854; 715/744; 715/733; 713/1; 713/2; 713/100; 709/224; 709/223

(58) Field of Search .......................... 717/171; 345/734, 345/736, 853, 744, 733; 713/1, 2, 100; 709/224, 223; 395/200

(56) References Cited

U.S. PATENT DOCUMENTS

| | | | | |
|---|---|---|---|---|
| 5,794,031 A | * | 8/1998 | Nakadai | 713/2 |
| 5,828,888 A | * | 10/1998 | Kozaki et al. | 717/170 |
| 6,678,888 B1 | * | 1/2004 | Sakanishi | 717/172 |
| 6,691,225 B1 | * | 2/2004 | Suffin | 713/2 |

* cited by examiner

*Primary Examiner*—Steve Sax
*Assistant Examiner*—Ryan Pitaro
(74) *Attorney, Agent, or Firm*—Cardinal Law Group; Jeffrey S. LaBaw

(57) ABSTRACT

A method of managing booting of a plurality of target devices in communication with a network is provided. A server in communication with the plurality of target devices receives a request from at least one target device in a pre-boot stage. A current boot category is assigned to the target device, the current boot category based on the pre-boot stage of the target device. A current boot list of target devices with corresponding current boot categories is generated. Systems and methods of using the present invention are also provided.

34 Claims, 5 Drawing Sheets

500

METHOD AND SYSTEM FOR BOOTING OF A TARGET DEVICE IN A NETWORK ENVIRONMENT BASED ON A PROVIDED ADMINISTRATOR TOPOLOGY GUI

BACKGROUND OF THE INVENTION

1. Field of the Invention

The present invention relates to client computers that are bootable over a network and, in particular, client computers that are bootable according to instructions from a generated administrator topology graphic user interface (GUI). More specifically, the present invention relates to a method for generating a GUI based on network topology which includes at least one target device to boot and booting at least one target device according to administrator input via the GUI.

2. Description of the Related Art

Some current computing devices include support for pre-boot extensions to download an operating system (OS) from a network to which they are attached. Such target computing devices include computer motherboards, network adapters and boot diskettes. These devices may rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NBP on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NBP. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

During current approaches to distributing an operating system to one or more target devices the network is unknown to the administrator during installation and/or configuration of new target devices that are not yet configured. That is, although these target devices exist and are connected to the network, they are not "seen" by the administrator because administrator defined parameters used to identify a target device (e.g., network address, subnet make, hostname, DNS, etc.) are provided by the operating system which is not yet available during pre-OS install.

It may be difficult in such a network environment to determine the true state of the network. However, especially in multiple geographic environments, for example, IS houses administering devices for multiple customers, knowledge of the current state of the network, including devices in pre-OS install stages, is critical.

It would be desirable therefore to provide a method of booting a target device in a network environment that overcomes the above.

Moreover, knowledge of overall network topology may provide other benefits, including, but not limited to: the ability to detect potential security holes, the ability to balance the loads of target devices and of distributors, and the ability to give feedback about what is happening over a particular network connection or connections.

SUMMARY OF THE INVENTION

One aspect of the present invention provides a method for managing booting of a plurality of target devices in communication with a network. A request is received at a server in communication with the network, from at least one target device in a pre-boot stage. A current boot category is assigned to the target device based on the pre-boot stage of the target device. A current boot list of target devices with corresponding current boot categories is generated and used to manage booting of the target devices.

At least one command based on the current boot category may be associated with the target device. The command may be executed at the target device. A command list comprising the command for the target device may be generated and the command to be executed at the target device may be selected from the command list. The current boot category of the target device may be updated based on the command.

The current boot category of the target device may be compared to a predetermined expected boot category of the target device to determine a boot difference between the expected boot category and the current boot category and a boot difference list comprising target devices with corresponding differences may be generated. At least one boot difference command based on the difference may be associated with the target device. The boot difference command may be executed at the target device. A boot difference command list comprising the boot difference command for the target device may be generated and the boot difference command to be executed at the target device may be selected from the boot difference command list. The current boot category of the target device may be updated based on the boot difference command. The current boot list and/or the boot difference list may be stored.

Another aspect of the present invention provides computer program product in a computer usable medium for managed booting of a plurality of target devices in communication with a network. The program may include means for receiving a request from at least one target device in a pre-boot stage at a server in communication with the network. The program may also include means for assigning a current boot category based on the pre-boot stage of the target device to the target device, means for generating a current boot list of target devices with corresponding current boot categories and means for managing booting of the target devices using the current boot list.

The program may also include means for associating at least one command based on the current boot category with the target device, the command based on the current boot category. The program may also include means for executing the command at the target device. The program may also include means for generating a command list comprising the command for the target device and means for selecting the command to be executed at the target device from the command list. The program may also include means for updating the current boot category of the target device based on the command. The program may also include means for comparing the current boot category of the target device to a predetermined expected boot category of the target device to determine a boot difference between the expected boot category and the current boot category and means for generating a boot difference list comprising target devices with corresponding differences.

The program may also include means for associating at least one boot difference command based on the difference with the target device. The program may also include means for executing the boot difference command at the target device. The program may also include means for generating a boot difference command list comprising the boot difference command for the target device and means for selecting the boot difference command to be executed at the target device from the boot difference command list. The program may also include means for updating the current boot category of the target device based on the boot difference command. The program may also include means for storing the current boot list and/or the boot difference list.

Another aspect of the present invention provides a system for managed booting of a plurality of target devices in communication with a network. The system may include means for receiving a request from at least one target device in a pre-boot stage at a server in communication with the network. The system may also include means for assigning a current boot category based on the pre-boot stage of the target device to the target device, means for generating a current boot list of target devices with corresponding current boot categories and means for managing booting of the target devices using the current boot list.

The system may also include means for associating at least one command based on the current boot category with the target device, the command based on the current boot category. The system may also include means for executing the command at the target device. The system may also include means for generating a command list comprising the command for the target device and means for selecting the command to be executed at the target device from the command list. The system may also include means for updating the current boot category of the target device based on the command. The system may also include means for comparing the current boot category of the target device to a predetermined expected boot category of the target device to determine a boot difference between the expected boot category and the current boot category and means for generating a boot difference list comprising target devices with corresponding differences.

The system may also include means for associating at least one boot difference command based on the difference with the target device. The system may also include means for executing the boot difference command at the target device. The system may also include means for generating a boot difference command list comprising the boot difference command for the target device and means for selecting the boot difference command to be executed at the target device from the boot difference command list. The system may also include means for updating the current boot category of the target device based on the boot difference command. The system may also include means for storing the current boot list and/or the boot difference list.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION OF THE PRESENTLY PREFERRED EMBODIMENTS

Figure 1:
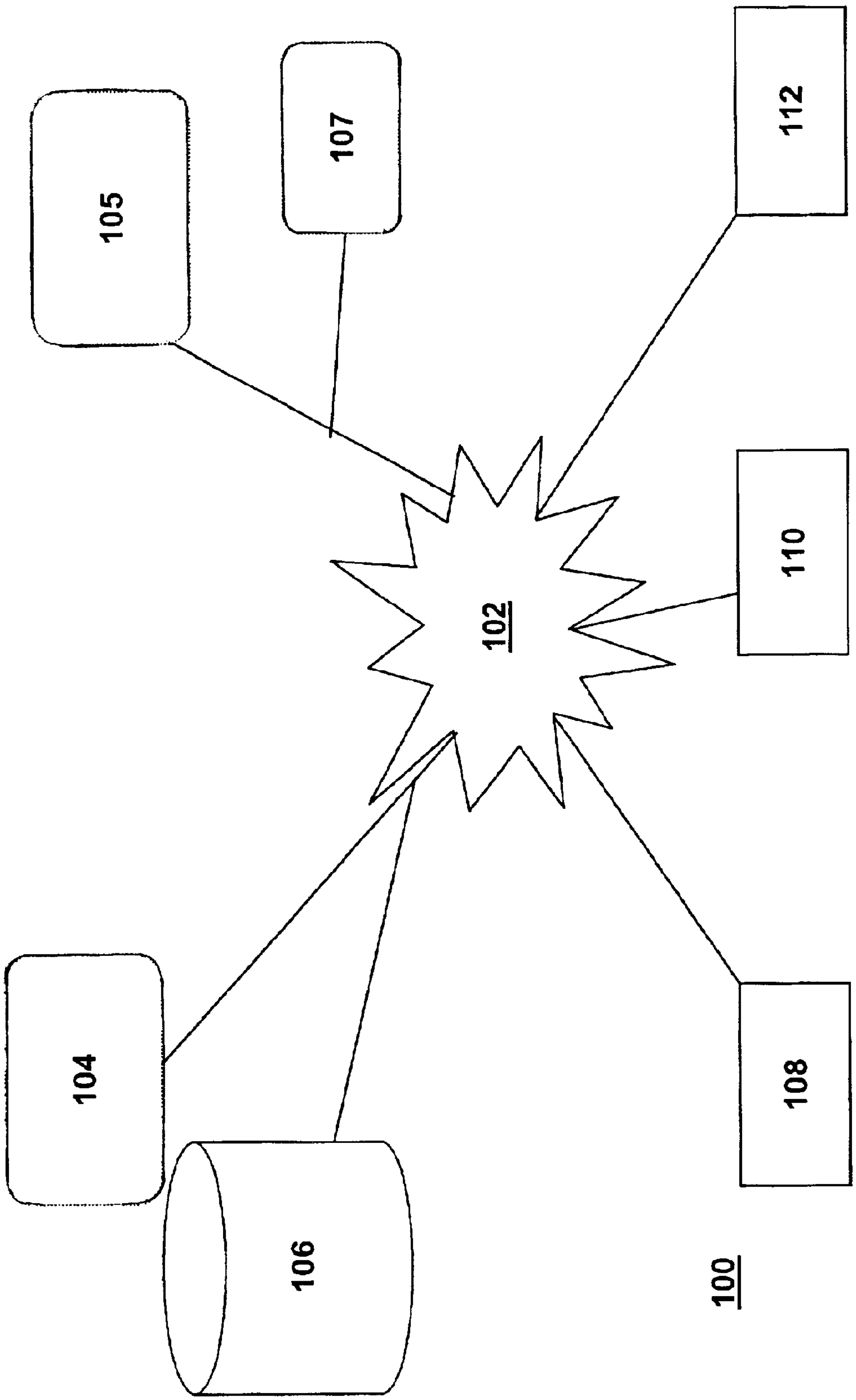
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105, which may be identical to or different from server 104. Server 105 may also provide data, such as boot files, operating system images and applications to network 102 and/or to other components in communication with network 102 as described below. System 100 may also include additional servers (not shown). In one embodiment of the invention, one or more of servers 104, 105 may be a DHCP/PXE Proxy Server.

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

The present invention may also provide a network environment, which may include a DHCP/PXE proxy server. For example, server 104 may be a DHCP/PXE proxy server. Alternatively, server 105 may be a DHCP/PXE proxy server. System 100 may also include one or more boot servers 107. For example server 104 or server 105 may serve as a boot server 107. These boot servers may be co-located on servers 104, 105 with the DHCP/PXE proxy servers. In one embodiment of the invention, one or more target devices, such as devices 108, 110, 112, may include pre-boot extensions that allow the devices to download OS information from a boot server 107.

The present invention may also provide a network environment, which may include one or more loading devices equipped with a remote loading feature and/or programs, such as, for example, a RPL function. For example, servers 104, 105 may serve as a loading device. Alternatively, one or more of target devices 108, 110, 112 may be equipped with a remote loading feature and/or programs and may serve as loading devices to other target devices. For example, a target device 108, 110, 112 equipped with a bootstrap program and a loader program may send the bootstrap program to one or more other target devices that broadcast a load request.

As described above, one embodiment of the present invention provides a network environment, which may include a boot server. For example, boot reservation server may be server 104, 105 or may be located on server 104, 105. Alternatively, as seen in FIG. 1, boot server may be a separate server as indicated at 107.

Boot server 107 may be any server capable of evaluating and/or managing network boot resources and/or parameters. For example, boot server 107 may be able to examine configuration files of target devices attached to the network and determine the OS of each target device. In one embodiment of the invention, boot server 107 may be able to generate and maintain a GUI describing the boot state of one or more target devices in the network. Boot server 107 may also received administrator input via the GUI for booting any of the target devices and for forwarding these instructions to the target device. Boot server 107 may also be able to determine other suitable information about a given target device such as, for example, parameters or descriptions provided by the system administrator, to make such determinations. Boot server 107 may be capable of dynamically determining or learning network boot resources and/or parameters. Boot server 107 may be capable of evaluating these parameters on a target device, a loading device or any other component of the network. For example, boot server 107 may be capable of detecting a given target device's hardware configuration and/or determining the boot stage of the target device.

Boot server 107 may also comprise or be able to access initial NBPs and/or other files corresponding to target device architectures that may be supported by network 102. For example, at least one NBP may be included for each type of target device supported by network 102. Each NBP may then be used for configuring any target device of a given type. Alternatively, these NPBs may be stored in any suitable storage location in communication with boot server 107. In some embodiments of the invention, the files corresponding to target device architectures may include all files needed to boot one or more undefined target devices. These files may also include files that can execute a scan of an undefined target device's installed hardware and software.

There may be more than a single instance of boot server 107 that is running a PXE Boot Service, and/or other services used to boot target devices. Moreover, it is contemplated that other network devices, such as gateways, routers, and servers, may redirect client boot service discover packets (and other protocol packets) originally directed to the IP address of the "primary" boot server 107 that has failed so that one or more "backup" boot servers may receive and process these packets. Thus, in some embodiments of the invention, the configuration of the local DHCP/PXE proxy servers may not be changed in the event that the "primary" boot server 107 fails. In some embodiments of the invention, the "primary" and "back-up" boot servers maintain or are able to access the definitions of one or more target devices. For example, definitions created on one boot server may be copied to the other boot servers.

Figure 2:
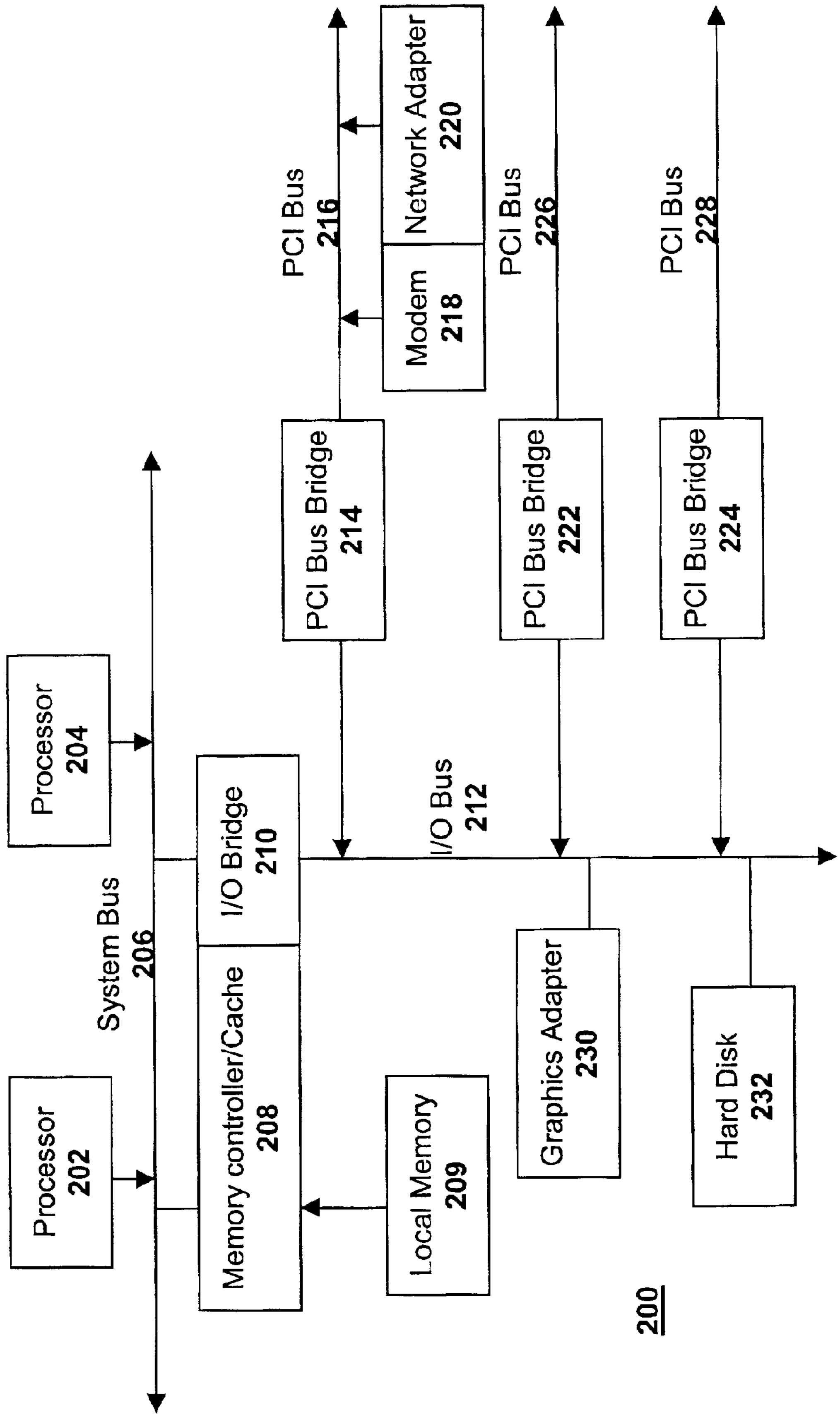
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. For example, in one embodiment of the invention, PCI buses 226, 228 may support a network adapter with a remote-loading feature, such as the RPL feature, installed. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

Figure 3:
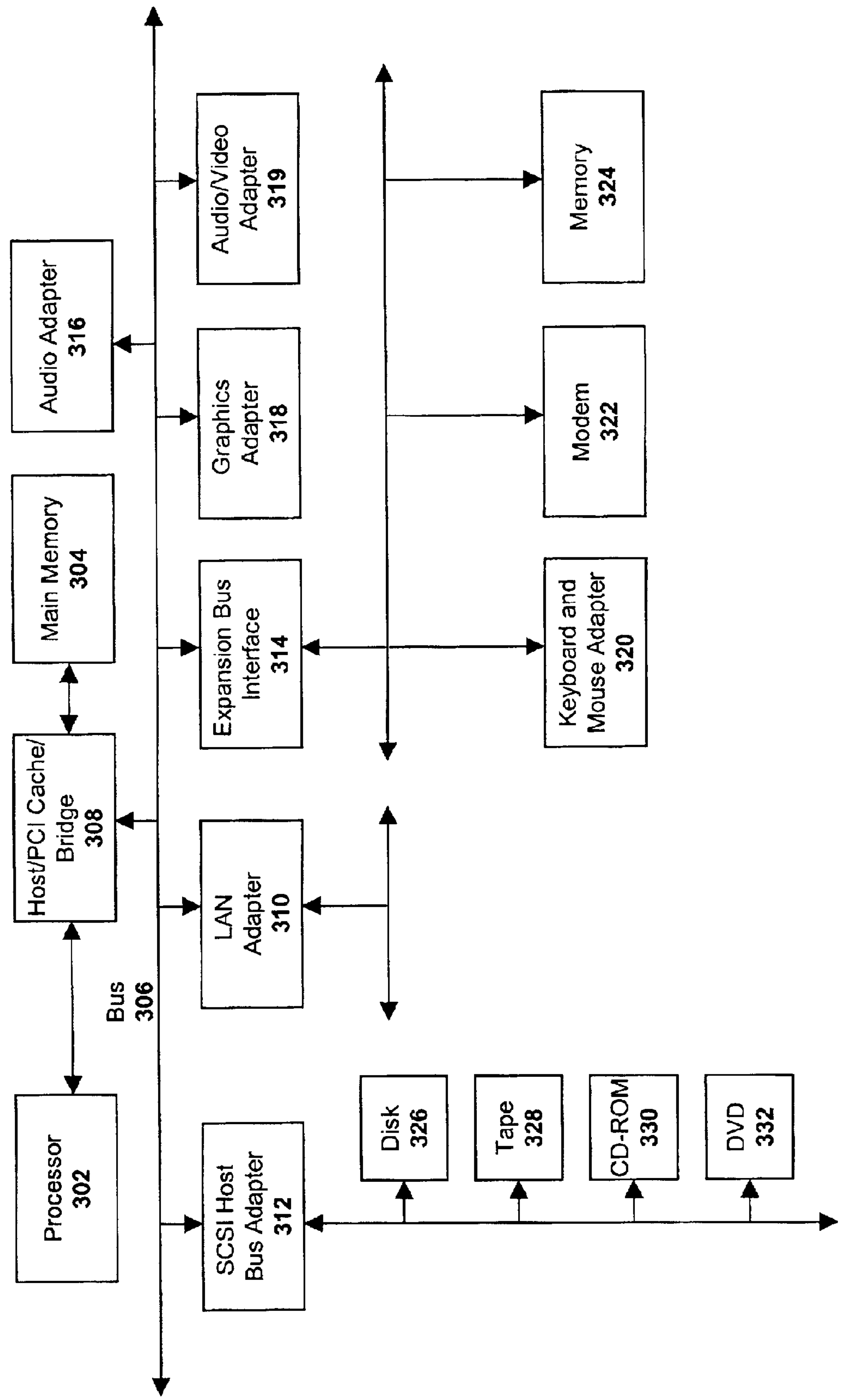
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108,110,112 depicted in FIG. 1 and described above. In one embodiment of the invention, data processing system 300 is a target device on which the disk drives are optional. Alternatively, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system, such as, for example, Linux™, OS/2 Warp 4, or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

In one embodiment of the invention, system 300 may include a suitable configuration file that may indicate boot parameters that may be evaluated to determine network boot resources as described above.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data. Another embodiment of data processing system 300 may include network adapters suited to transmit or receive functions of a remote loading program and/or feature such as the RPL feature.

Figure 4:
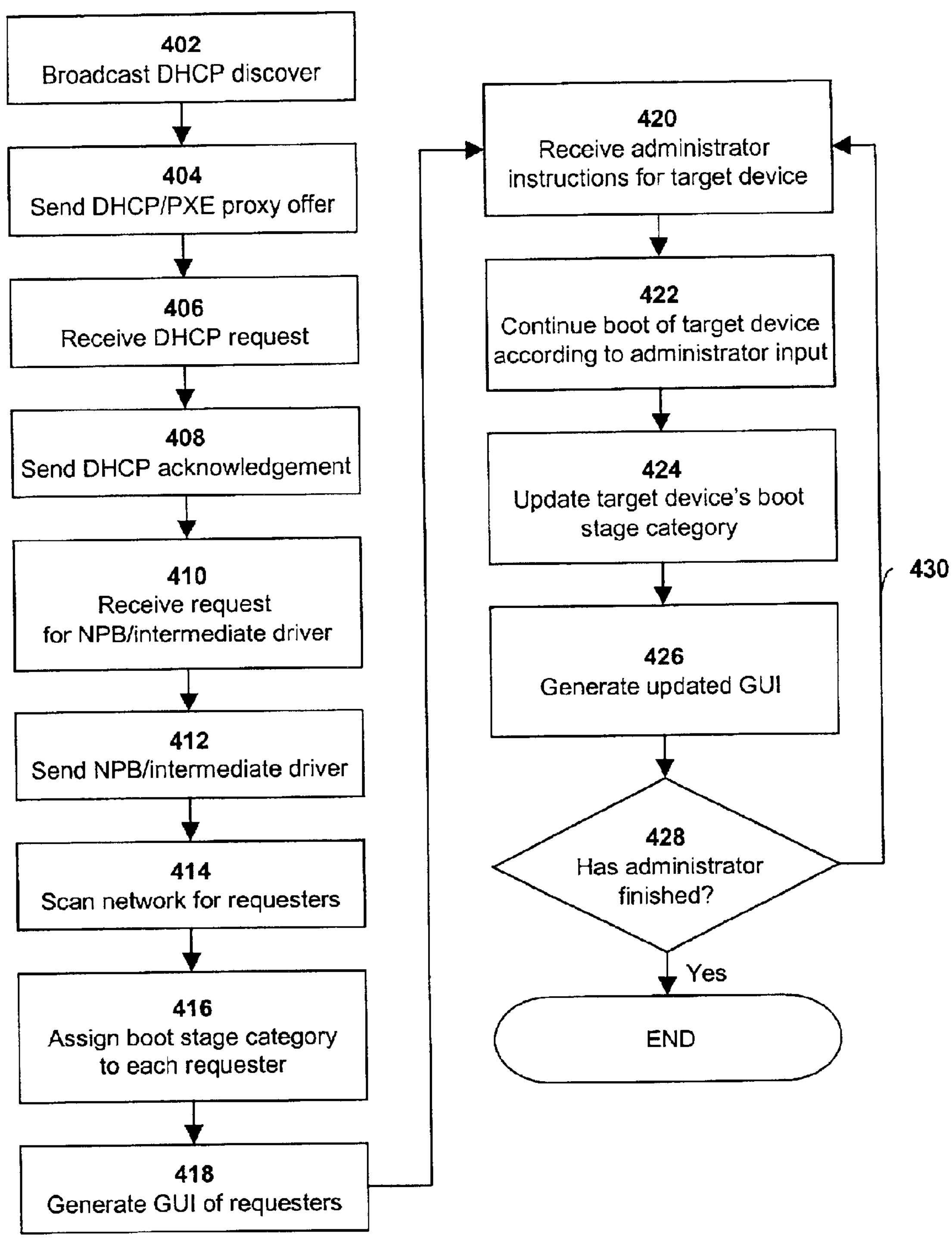
FIG. 4 is a flow diagram of one embodiment of a method of booting a target device in a network environment in accordance with the present invention.
Figure 5:
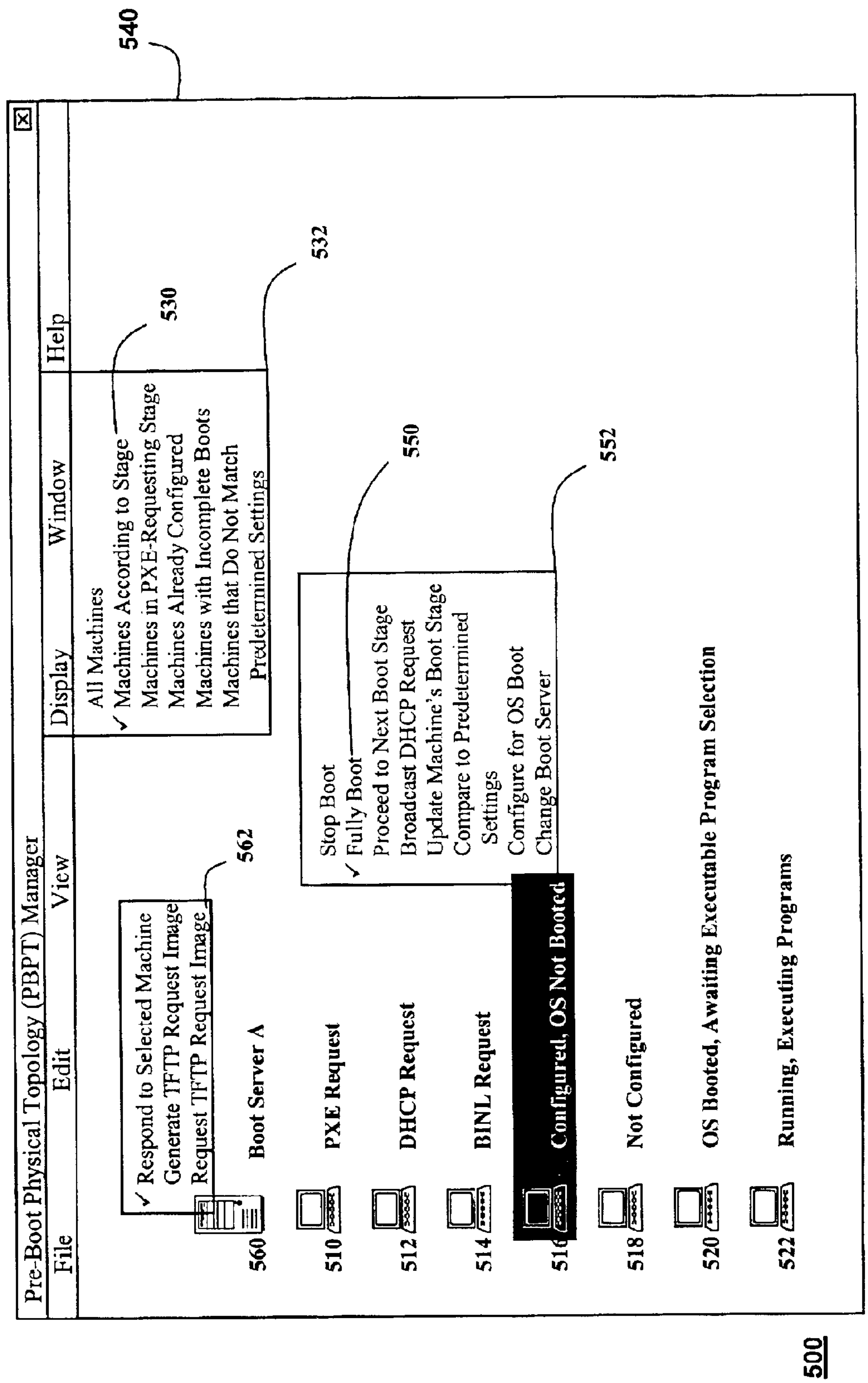
FIG. 5 is a graphic representation of one embodiment of a graphic user interface in accordance with the present invention.

FIG. 4 shows one embodiment of a method for booting a target device in accordance with the present invention. In the embodiment shown in FIG. 5, the target device may be a device containing a network interface that is enabled to support PXE and in which PXE ROM code starts operating on the target device when the target device initially begins to boot. In the embodiment of FIG. 5, the method is described from the perspective of a proxy server attempting to boot the target device; equivalent steps from the perspective of a boot server and the target device are also contemplated by the present invention. In one embodiment of the invention, the proxy server attempting to boot the target device and the boot server may be the same server. Proxy server and/or boot server may be, for example any one of servers 104, 105, 107. The target device may be, for example, one or more devices 108, 110, 112 depicted in FIG. 1 and described above.

Although the embodiment described in FIG. 4 may use active administrator input, in some embodiments of the invention, the method of FIG. 4 may be accomplished automatically. For example, administrator input may be determined automatically. Alternatively, administrator instructions may be set to default values and the methods of the present invention conducted automatically. Alternatively, administrator instructions may be input initially and the methods of the present invention subsequently conducted according to the initial instructions.

At block 402, the server may broadcast a DHCP discover or other similar request to one or more target devices. This server may be, for example a DHCP/PXE Proxy Server as described above. In the embodiment of FIG. 4, the server contains a DHCP/PXE proxy service that is enabled to indicate a PXE Boot Service on boot server 107 as described above. The DHCP broadcast or DHCP discover may be a request for DHCP/PXE proxy offers. This discover broadcast may request an IP address from one or more target devices. The broadcast may also indicate whether or not a target device is PXE enabled.

The configuration of the DHCP/PXE Proxy server may be implemented on more than one machine as described above. The "standard" DHCP service (which offers IP addresses to clients) and the "proxy" DHCP service (which directs clients to a PXE Boot Server Discovery service) may be in separate locations. If the DHCP services are in separate locations, there may be two separate communications in accordance with the present invention: a "standard" DHCP offer which offers an IP address to the client, and a "proxy" DHCP offer which directs the client to a PXE Boot Server Discovery service. Moreover, any suitable configurations of the DHCP/PXE servers may be used in accordance with the present invention so long as the target device may receive an IP address and be directed to the boot server. For example, any of the configurations described in the Intel PXE Specification Version 2.1 may be used in accordance with the present invention.

Additionally, there may be more than one instance of a "standard" DHCP service, of a "proxy" DHCP service, and/or of a "combined" DHCP service (i.e. a DHCP service that does both by offering an IP address to the target device and directing the target device to a Boot Discovery service) within the range of the target device's DHCP Discover broadcast. This can be accomplished by placing the instances of these DHCP services on machines located in the same sub-network as the target device, and/or by configuring network gateways and routers to forward the client's DHCP Discover broadcasts to DHCP services on machines located in other sub-networks.

Having more than one instance of these DHCP services can provide redundancy in case any one instance of these DHCP services becomes unable to respond to a given target device. If the target device receives more than one "standard", "proxy" or "combined" DHCP/PXE Proxy offer, it will select only one IP address for its use, and will select only one Central Boot Server IP address to be directed to.

At block 404, one or more of servers 104, 105 may make a DHCP/PXE Proxy Offer. This offer may serve to offer an IP address to one or more target devices. This offer may also communicate that a PXE boot service is available at the IP address of boot server 107.

At block 406, the server may receive a DHCP request from one or more target devices. This DHCP request may indicate that a given target device has requested or accepted the IP address offered to it. Such an acceptance may permit the target device to conduct all further point-to-point network-wide communications.

At block 408, the server may acknowledge the request of block 406. By acknowledging the request at block 406, the server may thus be able to confirm that a given IP address has been assigned to a specific target device.

At block 410, the server may then receive a TFTP request from the target device. In one embodiment of the invention, the request is for an initial NBP file. The request may also be a request for a bootstrap, for example, a bootstrap associated with a particular OS.

As seen at block 412, the server or the boot server may then send a response to the target device. For example, the server or boot server may conduct a TFTP transfer of the initial NBP to the target device as the response. In one embodiment of the invention, at this point, PXE ROM code may transfer execution from the server to the initial NBP, which has now been transferred to the target device. At this time the target device, or the initial NBP on the target device may now send a TFTP request for an additional files. These files may include, for example, an intermediate driver, which may be temporarily installed for example, a WSOD wedge driver installed in order to configured TCPIP drivers. These files may also be any suitable "wedge" that communicates with the discovery agent (such as the DHCP agent described above) in order to get an IP address of a particular device. These files may also be, for example, any suitable files that enable the target device to indicate its boot stage to the server. For example, these files may be files that bring the target device to a condition in which hardware and software scans may be run on the target device. In one embodiment of the invention, this condition is not fully "booted", i.e., the target device cannot yet perform useful end work for the user although it may be scanned. For example, in some embodiments of the invention, a rudimentary environment is provided on the target device so that one or more hardware and/or software scan programs may be run. This may be accomplished by an initial NBP, which transfers the rudimentary environment and scan program(s) to the target device before passing control over to the target device. In one embodiment of the invention, the files enabling the target device to indicate its boot stage may be included with the initial NBP transferred to the target device.

As seen at block 414, the server may then scan the network for any requesters. These requesters may include any device requesting files within the network environment, regardless of the boot stage of the device. For example, these requesters may include devices sending PXE requests, devices sending DHCP requests, devices sending BINL requests, devices which are configured but not yet booted, devices which are not configured, devices that already have their operating systems booted, devices that are already running their operating systems, etc. Table 1 shows some sample commands that may be used to scan the network for requesters. These commands may be used in any suitable combination in accordance with the present invention.

TABLE 1

| SAMPLE COMMAND | TYPE OF REQUESTER |
|---|---|
| GetPXERequestMachines | Devices transmitting PXE requests; not yet booted |
| GetDHCPRequestMachines | Devices transmitting DHCP requests; not yet booted |
| GetBINLRequestMachines | Devices transmitting BINL requests; not yet booted |
| GetConfiguredButNotBooted | Devices that have received their operating system but have not yet booted the OS; not yet booted |
| GetNotConfigured | Devices that have not yet requested an OS; not yet booted |
| GetOSBootedIPUPMachines | Devices that have booted their OS |

As seen at block 416, the scanned requesters may then be grouped according to their boot stage. In some embodiments of the invention, the boot stage of a particular target device describes the state of installation or configuration that the device is in. For example, as seen in Table 2, below, the devices may be grouped into stages including, but not limited to "not configured", "PXE-requesting stage", "DHCP-requesting stage", "BINL-requesting stage", "configured/not booted stage", and "OS booted". Moreover, in order to provide a complete network topology, the devices that are already up and running (i.e., devices that are typically "visible" to the administrator) may also be included, for example, as having a boot stage of "fully booted."

TABLE 2

| TYPE OF REQUESTER | BOOT STAGE |
|---|---|
| Devices transmitting PXE requests; not yet booted | PXE-Requesting |
| Devices transmitting DHCP requests; not yet booted | DHCP-Requesting |
| Devices transmitting BINL requests; not yet booted | BINL-Requesting |
| Devices that have received their operating system but have not yet booted the OS; not yet booted | Configured/Not Booted |
| Devices that have not yet requested an OS; not yet booted | Not Configured |
| Devices that have booted their OS | OS Booted |
| Devices that are running OS and are available to end-user | Fully Booted |

As seen at block 418, a GUI may then be generated by the server for the administrator. One embodiment of such a GUI is illustrated in FIG. 5 at 500.

Graphic user interface may comprise, for example a "window", screen or desktop 540. On screen 10 there can be one or more menus 532, 552, 562. These menus may be pop up menus or drop down menus as is well known in the art. These menus may also be any suitable menus offering choices of actions to a user, such as an administrator. When a user selects a given menu, the menu may show enabled and/or disabled actions. The user may select an action by placing a cursor over the desired action.

Such a GUI may provide a graphic overview of the network topology including devices in pre-boot stages. For example, the GUI may show the administrator that target device 510 is in a PXE-Requesting Stage. Meanwhile, target device 512 is in a DHCP-Requesting Stage, target device 514 is in BINL-Requesting Stage, target device 516 is in a Configured but not Booted state, target device 518 is in a Not Configured stage, target device 520 is in a stage where its OS is booted and target device 522 is fully booted and running.

The GUI may further provide the administrator with a plurality of choices regarding how to display the devices. For example, in the embodiment of FIG. 5, the choice "Display All Machines According to Boot Stage" is highlighted at 530 and the target devices are displayed accordingly on desktop 540. Alternative choices available in the drop down menu 532 of FIG. 5 include "Display Machines in PXE-Requesting Stage", "Display Machines Already Configured", "Display Machines with Incomplete Boots", "Display Machines That Do Not Match Network Settings". Other choices for displaying the network topology and associated target devices are also contemplated.

The GUI may also provide the administrator with a plurality of choices regarding actions to be taken regarding a particular target device. For example, in the embodiment of FIG. 5, the choice "Fully Boot Machine" is highlighted at 550 and the target device 516 to be fully booted under administrative supervision is selected accordingly on desktop 540. Alternatively choices available in the right-click menu 552 of FIG. 5 include "Stop Boot", "Proceed to Next Boot Stage", "Broadcast DHCP Request", "Update Machine Boot Stage", "Compare Machine to Network Settings". Other choices for actions to be taken with a particular device are also contemplated.

In some embodiments of the invention, the method of the present invention may compare a given target device with the expected physical network in order to provide the administrator with choices based on the comparisons. For example, a given target device may be expected to be already configured but is not yet configured for OS boot. Thus, one of the choices generated and made available to the administrator via GUI 500 regarding this target device may be "Configure Machine for OS boot". In another example, a given target device may be requesting an OS boot and the server connected to the target device is not responding. In such a case, one of the choices generated and made available to the administrator via GUI 500 regarding this device may be "Change Server" indicating that a boot request should be sent from the target machine to a different boot server. In some embodiments of the invention, one or more servers may also be indicated on GUI 500 such as, for example server 560. One or more choices may thus, also be made available to the administrator upon selecting server 560. For example, as seen in menu 562, the administrator has the choice "Respond to Selected Machine" available for server 560. In yet another example, a given target device may be missing an image for its TFTP request. In such a case, one of the choices generated and made available to the administrator via GUI 500 regarding this device may be "Generate TFTP request image for Machine" or "Request TFTP image for Machine".

Returning now to block 420, the server may receive administrator instructions for one or more target devices via the GUI generated at block 418. For example, the server may receive instructions to order the target devices according to boot stage. Alternatively, the server may receive instructions to fully boot a particular target device so that it proceeds under administrator supervision from its current boot stage to a stage of being fully booted. Alternatively, the server may receive instructions to move all target devices in one boot stage to another boot stage (e.g., determine all target devices that are in PXE-requesting stage and fully boot them.) Other scenarios are also contemplated.

As seen at block 422, the server may continue booting one or more target devices according to administrator input received at block 420. For example, the server or boot server may transfer suitable files to the target device or devices described by the administrator at block 420. These files may accomplish the instructions provided by the administrator at block 420. For example, if an administrator instructs that all DHCP-requesting devices should be fully booted, at block 422, DHCP acknowledgements, NPBs and appropriate TFTP files may be sent to all such target devices.

As seen at block 424, the boot stage category of one or more target devices may be updated. In some embodiments of the invention, the devices described by the administrator at 420, which are subsequently acted upon at block 422, may have proceeded to a different boot stage. Continuing the above example, all target devices which were DHCP requesting devices will become fully booted devices after administrator instructions are executed at block 422. Thus, these devices will be grouped into the "Fully Booted" stage rather than the "DHCP-Requesting Stage"

As seen at block 426, an updated GUI may be generated. The updated GUI may include choices similar to those originally provided to the administrator. Alternatively, the updated GUI may include different choices, which reflect a different network topology that, in turn, reflects different boot stages for a plurality of target devices.

As seen at block 428, it may be determined if the administrator has finished providing instructions via the GUI. If the administrator has not finished, the method of the present invention may continue to receive instructions from the administrator regarding one or more target devices, may continue to execute these instructions, may continue to update the boot stage categories and may continue to generate an updated GUI for the administrator as indicated at block 430. Alternatively, if the administrator has finished, the method of the present invention may end. Once ended, for example, the administrator may continue to monitor the state of network topology using the GUI(s) generated in accordance with the present invention. Alternatively, the GUI may be used to automatically manage the network. Alternatively, the administrator may turn over booting of target devices to the server.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

What is claimed is:

1. A method of interactively managing booting of a plurality of target devices in communication with a network, comprising:

receiving, at a server in communication with the network, a request from at least one target device in a pre-boot stage;

assigning a current boat category to the target device, the current boot category based on the pre-boot stage of the target device; and generating a boot graphical user interface comprising a boot list of target devices with corresponding current boot categories.

2. The method of claim 1 further comprising:

associating at least one command with the target device, the command based on the current boot category.

3. The method of claim 2, further comprising:

executing the command at the target device.

4. The method of claim 1, further comprising:

generating a command list in association with the boot graphical user interface, the command list comprising at least one command to be executed at the target device; and selecting the command from the command list.

5. The method of claim 4, further comprising:

updating the boot list based on the command.

6. The method of claim 1, further comprising:

comparing the current boot category of the target device to a predetermined boot category of the target device to determine a boot state difference; and generating a boot stare difference list in association with the boot graphical user interface, the boot state difference list comprising target devices with corresponding boot state differences.

7. The method of claim 6, farther comprising:

associating at least one boot difference command with the target device, the boot difference command based on the boot state difference.

8. The method of claim 7, further comprising:

executing the boot difference command at the target device.

9. The method of claim 7, further comprising:

generating a boot difference command list in association with the boot graphical user interface, the boot difference command list comprising at least one boot difference command to be executed at the target device; and selecting the boot difference command from the boot difference command list.

10. The method of claim 7, further comprising:

updating the boot state difference list based on the boot difference command.

11. The method of claim 1, further comprising:

storing the boot list.

12. The method of claim 6, further comprising:

storing the boot state difference list.

13. Computer program product in a computer usable medium for interactively managed booting of a plurality of target devices in communication with a network, comprising:

means for receiving, at a server in communication with the network, a request from at least one target device in a pre-boot stage;

means for assigning a current boot category to the target device, the current boot category based on the pre-boot stage of the target device; and means for generating a boot graphical user interface comprising a boot list of target devices with corresponding current boot categories.

14. The program of claim 13, further comprising:

means for associating at least one command with the target device, the command based on the current boot category.

15. The program of claim 14, further comprising:

means for executing the command at the target device.

16. The program of claim 13, further comprising:

means for generating a command list in association with the boot graphical user interface, the command list comprising at least one command to be executed at the target device; and means for selecting the command from the command list.

17. The program of claim 16, further comprising:

means for updated the boot list based on the command.

18. The program of claim 13, further comprising:

means for comparing the current boot category of the target device to a predetermined boot category of the target device to determine a boot state difference; and means for generating a boot stare difference list in association with the boot graphical user interface, the boot state difference list comprising target devices with corresponding boot differences.

19. The program of claim 18, further comprising:

means for associating at least one boot difference command with the target device, the boot difference command based on the boot state difference.

20. The program of claim 19, further comprising:

means for executing the boot difference command at the target device.

21. The program of claim 19, further comprising:

means for generating a boot difference command list in association with the boot graphical user interface, the boot difference command list comprising at least one boot difference command to be executed at the target device; and means for selecting the boot difference command from the boot difference command list.

22. The program of claim 19, further comprising:

means for updating the boot state difference list based on the boot difference command.

23. The program of claim 13, further comprising:

means for storing the boot list.

24. The program of claim 18, further comprising:

means for storing the boot state difference list.

25. A system for interactively managing booting of a plurality of target devices in communication with a network, comprising:

means for receiving, at a server in communication with the network, a request from at least one target device in a pre-boot stage;

means for assigning a current boot category to the target device, the current boot category based on the pre-boot stage of the target device; and means for generating a boot graphical user interface comprising a boot list of target devices with corresponding current boot categories.

26. The system of claim 25, further comprising:

means for associating at least one command with the target device, the command based on the current boot category.

27. The system of claim 26, further comprising:

means for executing the command at the target device.

28. The system of claim 25, further comprising:

means for generating a command list in association with the boot graphical user interface, the command list comprising at least one command to be executed at the target device; and means for selecting the command from the command list.

29. The system of claim 28, further comprising:

means for updating the boot list based on the command.

30. The system of claim 25, further comprising:

means for comparing the current boot category of the target device to a predetermined boot category of the target device to determine a boot state difference; and means for generating a boot state difference list in association with the boot graphical user interface, the boot state difference list comprising target devices with corresponding boot state differences.

31. The system of claim 30, further comprising:

means for associating at least one boot difference command with the target device, the boot difference command based on the boot state difference.

32. The system of claim 31, further comprising:

means for executing the boot difference command at the target device.

33. The system of claim 31, further comprising;

means for generating a boot difference command list in association with the boot graphical user interface, the boot difference command list comprising at least one boot difference command to be executed at the target device; and means for selecting the boot difference command from the boot difference command list.

34. The system of claim 31, further comprising:

means for updating the boot state difference list based on the boot difference command.

* * * * *

UNITED STATES PATENT AND TRADEMARK OFFICE

CERTIFICATE OF CORRECTION

PATENT NO. : 6,941,518 B2
DATED : September 6, 2005
INVENTOR(S) : French et al.

It is certified that error appears in the above-identified patent and that said Letters Patent is hereby corrected as shown below:

Column 13,
Line 44, please replace with the following:
-- assigning a current boot category to the target device, the --.

Column 14,
Line 1, please replace with the following:
-- generating a boot state difference list in association with --.
Line 5, please replace with the following:
-- 7. The method of claim 6 further comprising: --.
Line 54, please replace with the following:
-- means for updating the boot list based on the command. --.
Line 60, please replace with the following:
-- means for generating a boot state difference list in asso- --.

Column 16,
Line 37, please replace with the following:
-- 35. The system of claim 35, further comprising: means for storing the boot list.
36. The system of claim 30, further comprising:
means for storing the boot state difference list. --.

Signed and Sealed this

Twenty-ninth Day of November, 2005

JON W. DUDAS
*Director of the United States Patent and Trademark Office*